United States Patent [19]
Lorenc

[11] Patent Number: 5,129,264
[45] Date of Patent: Jul. 14, 1992

[54] CENTRIFUGAL PUMP WITH FLOW MEASUREMENT

[75] Inventor: Jerome A. Lorenc, Seneca Falls, N.Y.

[73] Assignee: Goulds Pumps, Incorporated, Seneca Falls, N.Y.

[21] Appl. No.: 623,696

[22] Filed: Dec. 7, 1990

[51] Int. Cl.⁵ .................................................. G01F 1/34
[52] U.S. Cl. .................................. 73/861.42; 73/168; 415/206
[58] Field of Search ...................... 73/68, 861, 861.42; 415/206; 417/20, 43

[56] References Cited

U.S. PATENT DOCUMENTS 4,789,301 12/1988 Osborne .............................. 415/206
4,821,580 4/1989 Jorritsma .............................. 73/861

*Primary Examiner*—Herbert Goldstein
*Attorney, Agent, or Firm*—Bean, Kauffman & Spencer

[57] ABSTRACT

An improved pump casing and process for measuring fluid flow through a centrifugal pump casing is disclosed wherein the static pressure of a fluid being pumped by said pump is measured at a first point in the pump discharge inlet area of the pump adjacent the flow arm of the pump and at a second point removed along the nozzle, the pressures are compared to a predetermined flow constant of the casing.

19 Claims, 2 Drawing Sheets

CENTRIFUGAL PUMP WITH FLOW MEASUREMENT

The invention relates to centrifugal pumps adapted for measuring the flow of fluids therethrough and more particularly to an apparatus and method for determining fluid flow through a centrifugal pump by measuring differential pressure.

BACKGROUND OF THE INVENTION

The measurement of fluid flow through a centrifugal pump with convenient read-out of repeatable accuracy has generally been a difficult process and typically requires the attachment of sensors and instrumentation downstream of the pump. At the same time, there is a demand for a simple, effective and reliable means for measuring fluid flow at the pump itself. A typical centrifugal pump of the prior art comprises an impeller, rotatably mounted in a stationary casing with the rotating impeller imparting pressure and kinetic energy to the fluid being pumped, and the stationary casing guiding the fluid to and from the impeller. In a typical centrifugal pump casing, which generally includes concentric, diffusor and volute type centrifugal casings, the rotation of the impeller imparts kinetic energy to the fluid and causes fluid flow, in a generally circular direction about the perimeter of the impeller, through the casing surrounding the impeller. At some point in the casing the fluid flows from the perimeter of the impeller, passes a cut-water or the like through a area of the pump generally known as the discharge inlet area and through the discharge nozzle to the pump discharge.

In the operation of the pump, the fluid flow can be affected by the design of the impeller, the design and size of the casing, the speed at which the impeller rotates, the design and size of the pump inlet and outlet, quality of finish of the components, presence of a casing volute and the like. The incorporation of flow measurement devices within the pump are typically seen as creating added obstruction to fluid flow and further flow variations.

Thus the convenience of a relatively easy means for the measurement of fluid flow integral with the centrifugal pump has not been generally available in the industry and is long overdue.

The principal object of this invention is to provide a centrifugal pump adapted for measuring fluid flow.

Another object of this invention is to provide a method for the measurement of fluid flow through a centrifugal pump which is convenient and relatively non obstructive to fluid flow. These and other objects of the invention will become apparent from the following.

SUMMARY OF THE INVENTION

It has been found that centrifugal pumps generally demonstrate what can be termed a "flow constant", that is, a generally constant numerical value related to fluid flow which is particular to the size and design of the casing, impeller and impeller rotational speed. It has also been found that once established for a particular impeller and impeller rotational speed, the flow constant of a pump casing can be conveniently used to measure fluid flow through the pump by comparison of pressure differentials at select locations in the pump regardless of downstream restrictions.

According to the present invention there is provided a process for measuring fluid flow through a centrifugal pump casing wherein an impeller turning at generally constant speed pumps fluid through a casing past a cut-water and a pump discharge inlet area, through a pump discharge nozzle to a discharge outlet comprising: determining the flow constant of said pump casing containing said impeller turning at said constant speed; measuring the pressure head of a fluid being pumped by said pump at a first point in said pump discharge inlet area; measuring the pressure head of a fluid being pumped by said pump at a second point, spaced from said pump discharge inlet area, in said discharge nozzle; and, comparing the differential in pressure head between said first point and said second point with said flow constant.

The invention further provides an improved fluid flow measuring centrifugal pump having a casing, a suction inlet, a driving shaft, a centrifugal impeller mounted on said shaft within said casing, a cut-water, a pump discharge inlet area, and a discharge outlet communicating with said pump discharge inlet area through a discharge nozzle, the improvement comprising first pressure head sensing means in said pump inlet discharge area; second pressure head sensing means in said discharge nozzle; and, means for comparison of data from said pressure sensing means with a flow constant.

The nature, principles and details of the invention as well as other objects and features thereof, will be more clearly apparent from the following description taken in connection with the accompanying drawings in which like parts are designated by like reference characters.

DETAILED DESCRIPTION OF THE INVENTION

Figure 1:
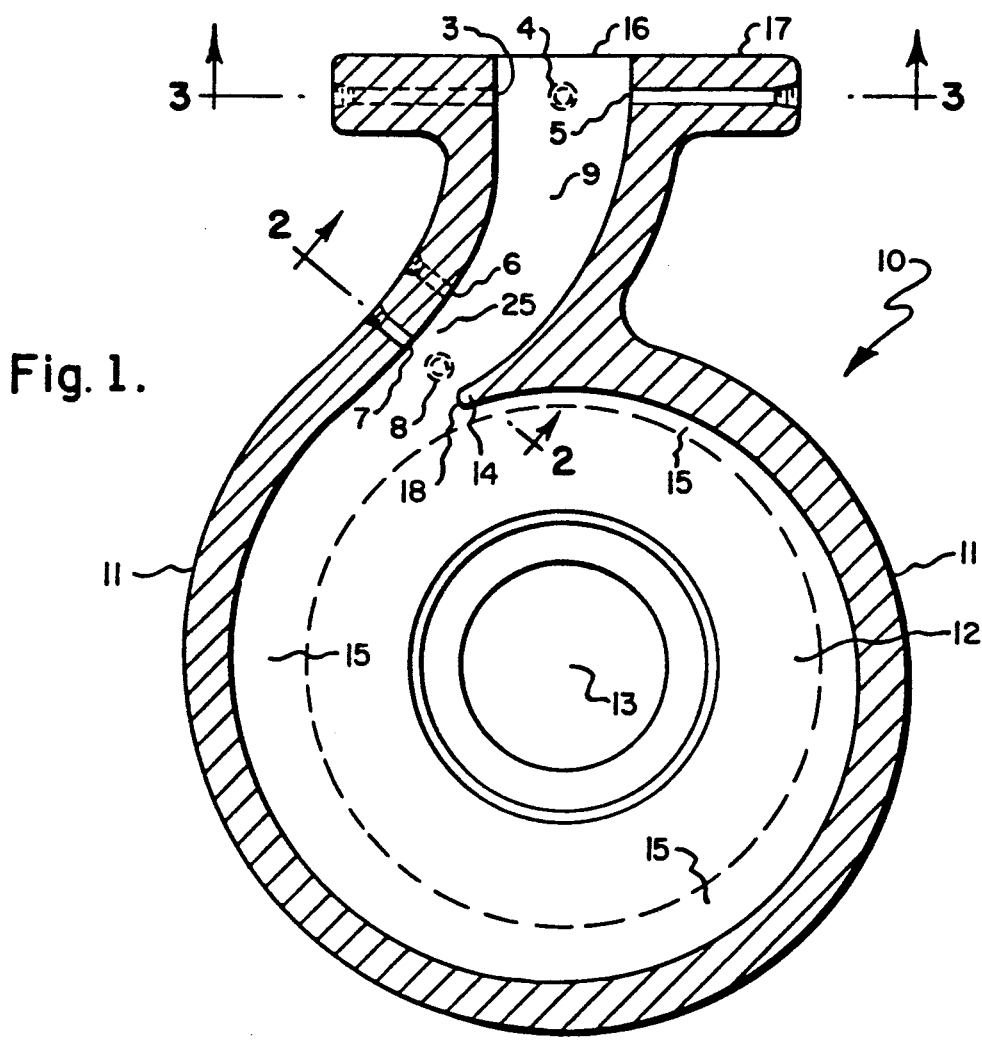
FIG. 1 is a sectional view of a centrifugal pump of the invention.

Referring now to FIG. 1, therein is shown a pump 10 having a pump casing 11, impeller 12, impeller drive shaft 13 which is connected to a drive motor (not shown), cut-water 14, casing volute 15, discharge nozzle 9, pump discharge outlet 16 and pump outlet attachment flange 17. Adjacent said cut-water 14 are sensor taps 6, 7 and 8, with taps 6 and 7 being positioned about opposite cut-water 14. Sensor taps 7 and 8 are disposed on about a 90 degree plane to the longitudinal axis of casing volute 15 at about leading edge 18 of cut-water 14 in the portion of the casing generally termed pump discharge inlet area 25. Pump discharge inlet area 25 comprises an area of the casing starting in the casing volute beginning before about cut-water leading edge 18 and extending beyond the cut-water to the area of the casing generally known as the discharge nozzle. The precise boundaries of the pump discharge inlet area can change depending upon the size and design of the pump but can be generally defined, for purposes of this invention, as that area adjacent the cut-water, within which a pressure head can be measured which, when compared to a pressure head spaced therefrom outside the pump discharge inlet area, along the discharge nozzle, will respond to changes in flow rate with changes in head pressure that follow a generally predictable mathematical relationship.

Sensor taps 3, 4 and 5 are displaced along discharge nozzle 9 from taps 6, 7 and 8, beyond pump discharge inlet area 25, toward said pump discharge outlet 16 in attachment flange 17. Tap 4 is in the same side of the casing as tap 8, tap 3 is in an opposite side of the casing as cut-water 14 and tap 5 is in an opposite side of the casing as taps 6 and 7. Tap 6 is disposed in the casing at a point in pump discharge inlet area 25 spaced from taps 7 and 8.

The sensor taps are presented in the figures as passages through which fluid can flow for measurement of the pressure head at a position in the pump casing. It should be understood, that the illustration of sensor tap passages in the drawings are merely meant to be representative of positions of measurement for convenient explanation in accordance with the invention. Any appropriate sensing means, which are suitable to designate pressure, may be used in conjunction with the representative positions. Thus, sensing means in accord with the invention includes a passage through which fluid flows to remote or included instrumentation for pressure designation and the like, as well as electronic, mechanical or the like sensing means installed at the position of the passage that provides data to remote or included instrumentation or the like.

Figure 2:
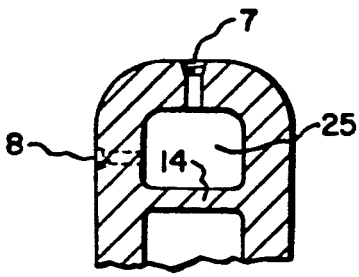
FIG. 2 is an enlarged fragmentary section of the centrifugal FIG. 1 taken along about line 2—2.

FIG. 2, is a fragmentary section along about line 2—2 of FIG. 1, showing the relative position of sensor taps 7 and 8 to each other and to cut-water 14.

Figure 3:
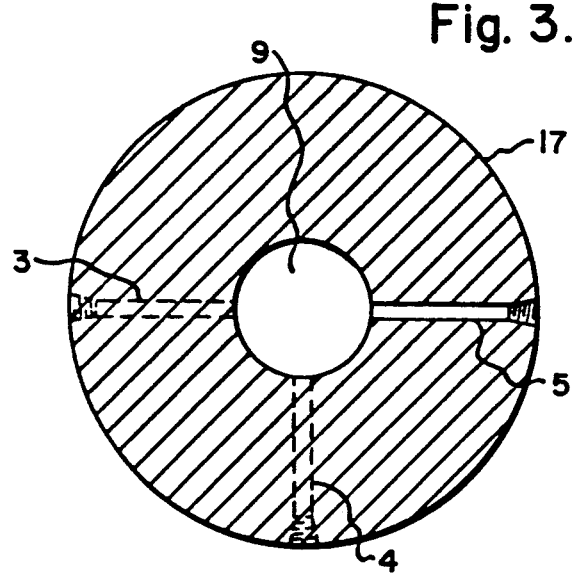
FIG. 3 is a sectional of the centrifugal pump of FIG. 1 taken along about line 3—3.

FIG. 3 is a top section along about line 3—3 of FIG. 1, illustrating the relative position of sensor taps 3, 4 and 5 to each other and to attachment flange 17.

Figure 4:
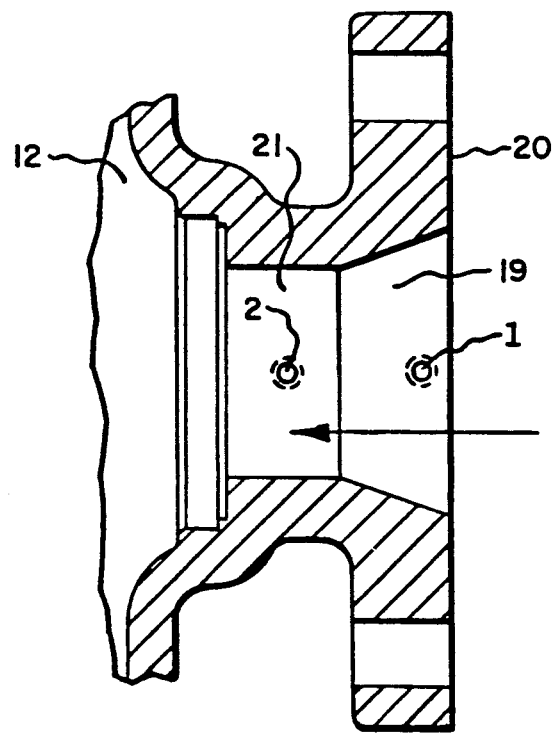
FIG. 4 is a fragmentary sectional view of an inlet of a centrifugal pump of the invention.

FIG. 4, is a fragmentary section of pump inlet 19 of centrifugal pump of FIG. 1. Therein, pump casing comprises pump inlet attachment flange 20 wherein fluid flows in the direction of the arrow to impeller 12. Sensor taps 1 and 2 are spaced from each other, with tap 1 being positioned in the inlet attachment flange and tap 2 being positioned in inlet passage 21.

In comparative testing of the invention, the inlet of the centrifugal pump of FIG. 1 was connected to a fluid reservoir. The outlet was connected to a commercial fixed Venturi tube head meter which in turn was connected through a variable flow valve back to the reservoir. Input and output to the reservoir was at the same fluid level within the reservoir. The pump was activated to a predetermined impeller speed and allowed to come to a steady state of pumping efficiency with the valve fully open. The valve was then restricted to control fluid flow therethrough to various actual flow rates as determined by differential pressure calculation obtained at the fixed Venturi tube head meter in accordance with a standard commercial method supplied by the manufacturer of the Venturi tube head meter. In accordance with such method, calculation of the actual flow (Q) of the pump was determined by using the formula:

$$Q = K(\sqrt{\Delta P})$$

wherein Q is the volume rate of flow in gallons per minute (gpm); K is the meter constant which was supplied by the manufacturer of the Venturi meter; and, $\Delta P$ is the differential head in feet of fluid flowing through the Venturi meter.

Figure 5:
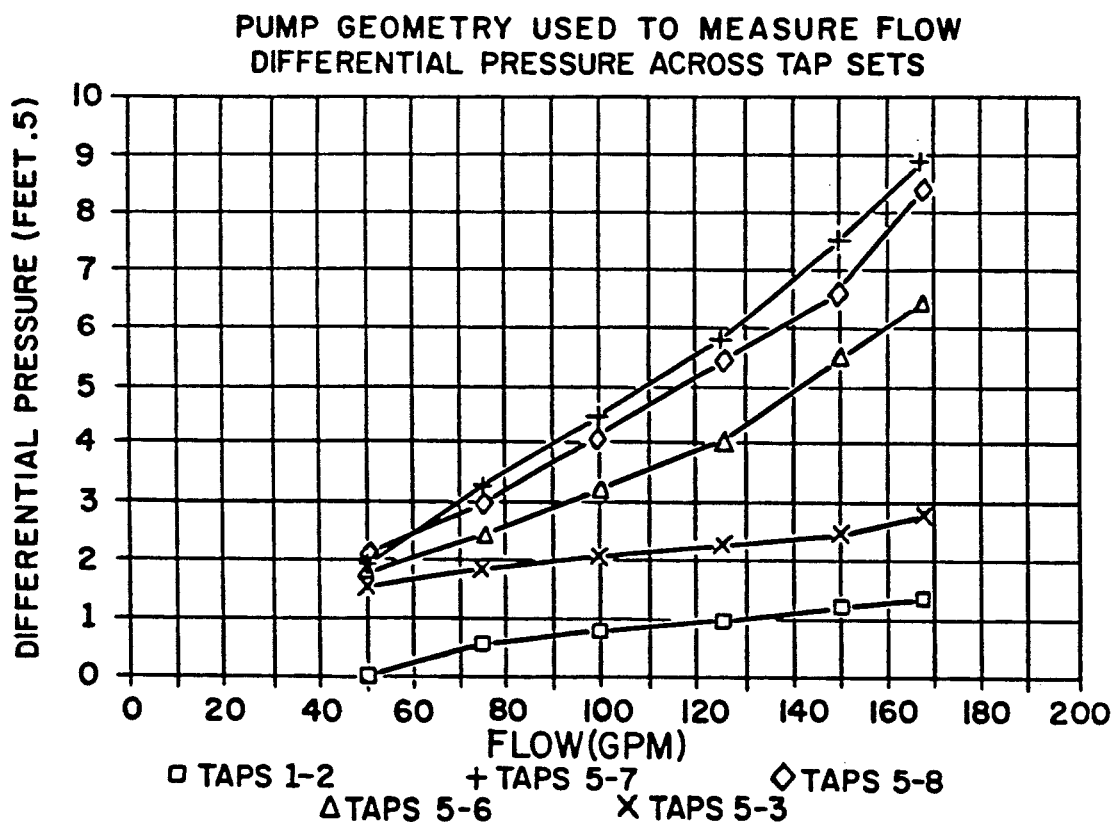
FIG. 5 is a graph of experimental data showing fluid flow plotted against the square root of differential pressure.

The pressure head differential between various of taps 1-8 was measured coincidentally with the differential pressure flowing through the Venturi meter, by means of a manometer connected at the various taps, at the various flow rates. FIG. 5 is a graph of the square root of pressure differentials obtained coincidentally between select taps, as compared against actual flow rates calculated as indicated above by conventional means at the Venturi meter, at an impeller speed of 3600 RPM. As can be seen the square root of pressure differentials between taps 5 and 7 provide a generally linear relationship with actual fluid flow, with taps 5-8 and taps 5-6 being somewhat less linear and having smaller pressure differentials. Taps 1-2 and 5-3 had very low pressure differentials which indicated limited utility for easily measuring fluid flow.

The generally linear relationship in the square root of pressure differential between taps 5 and 7 as compared to actual flow generally follows the mathematically expression:

$$Q = K(\sqrt{\Delta P}) + C$$

wherein Q is rate of fluid flow; K is the pump flow constant; $\Delta P$ is the differential pressure between taps 5 and 7; and, C is a correction factor. Using the actual flow rate and the actual pressure differentials from taps 5 and 7, pump flow constants and correction factors were calculated for the pump at various impeller RPM's.

The following polynomial formulas were determined, useful to directly calculate fluid flow rate for the pump at various RPM's within an accuracy of about 2% at a flow rate of from about 20% to about 125% of the Best Efficiency Point (BEP) flow of the pump. At an 1800 RPM impeller speed a suitable polynomial formula was found to be $Q = 18.99964 (\sqrt{\Delta P} + 5.529$; at 3600 RPM, $Q = 17.9399 (\sqrt{\Delta P} + 15.656$; and at 5400 RPM, $Q = 16.9374 (\sqrt{\Delta P} + 25.951$.

It should be understood that the above formulas are merely examples of typical formulas that might use the differential pressure data for ascertaining fluid flow and that the invention is not limited thereto.

From the graph presented in FIG. 5 it should be apparent that the positioning of the sensor taps is significant to obtaining adequate differential pressure data for convenient and accurate measurement of fluid flow in the centrifugal pump. It has been found that when a first tap is positioned in the pump discharge inlet area, adjacent about the cut-water, and a second tap is spaced therefrom along the discharge nozzle, a generally linear relationship between fluid flow and the square root of the pressure head differential can be established which has sufficient pressure differential for convenient measurement. In a preferred embodiment a first tap would be positioned in the pump discharge inlet area adjacent about the leading edge of the cut-water and a second tap positioned in the discharge nozzle at about the outlet flange.

In the positioning of differential pressure taps, particularly for the passage of fluid to a pressure sensor, it has been found preferable that the passageways be aligned at a right angle to the casing surface at its position in the discharge inlet area or discharge nozzle. Such alignment appears to reduce the effect of changes in fluid velocity within the casing as a component of the pressure head at the passageway and generally provides improved accuracy for determining fluid flow. Generally, it is also preferable to position such taps at opposing sides of the casing along the curvature of the volute as shown for taps 5 and 7 to maximize the head pressure differential.

I claim:

1. An improved process for measuring fluid flow through a centrifugal pump casing wherein an impeller, turning at generally constant speed, pumps fluid past a cut-water and a pump discharge inlet area, through a pump discharge nozzle to a discharge outlet, the improvement comprising: measuring the pressure head of a fluid being pumped by said pump at a first point in said pump discharge inlet area; measuring the pressure head of a fluid being pumped by said pump at a second point, spaced from said pump discharge inlet area, in said discharge nozzle; and, comparing the differential in pressure head between said first point and said second point, together with a pump flow constant, to measure fluid flow.

2. The process of claim 1 wherein said pump flow constant comprises a factor that generally equates a known restricted flow rate of a fluid through said pump casing containing said impeller turning at said constant speed with the square root of a measured pressure differential obtained from measuring pressure heads at said first and second points at said known restricted flow rate.

3. The process of claim 2 wherein the square root of the pressure differential is factored with said pump flow constant and a correction factor to measure fluid flow in accordance with the mathematical expression $Q = K\sqrt{\Delta P} + C$, wherein Q is fluid flow rate, K is the pump flow constant $\Delta P$ is the pressure differential and C is a numerical constant.

4. The process of claim 1 wherein said first point is in said pump discharge inlet area adjacent the leading edge of the cut-water.

5. The process of claim 1 wherein said second point is in the discharge nozzle at the discharge flange.

6. The process of claim 1 wherein said first and second point comprise sensor taps.

7. The process of claim 6 wherein said sensor taps comprise fluid pressure sensors.

8. The process of claim 6 wherein said sensor taps comprise passages for the flow of fluid from the pump discharge inlet area and discharge nozzle.

9. The process of claim 1 wherein differential pressure between said first and second points is directly measured.

10. The process of claim 2 wherein the known fluid flow rate is measured externally of the pump casing.

11. In a centrifugal pump having a casing, a suction inlet, a driving shaft, a centrifugal impeller mounted on said shaft within said casing, a pump discharge inlet area, and a discharge outlet communicating with said inlet area past a cut-water and through a discharge nozzle, the improvement comprising means for sensing a first pressure head at said pump discharge inlet area and means for sensing a second pressure head, spaced from said means for sensing a first pressure head, at said discharge nozzle toward said discharge outlet.

12. The pump of claim 11 comprising a casing volute.

13. The pump of claim 11 comprising means for comparison of data from said pressure sensing means with a flow constant.

14. The pump of claim 11 wherein said first pressure head is sensed at a point in said pump discharge inlet area adjacent the leading edge of the cut-water.

15. The pump of claim 11 wherein said second pressure head is sensed at a point in the discharge flange.

16. The pump of claim 11 wherein said means for sensing a pressure head comprise sensor taps.

17. The pump of claim 16 wherein said sensor taps comprise fluid pressure sensors.

18. The pump of claim 16 wherein said sensor taps comprise passages for the flow of fluid from the pump discharge inlet area and discharge nozzle.

19. The pump of claim 11 comprising means for measuring differential pressure between said first and second pressure heads.

* * * * *

UNITED STATES PATENT AND TRADEMARK OFFICE
CERTIFICATE OF CORRECTION

PATENT NO. : 5,129,264
DATED : 7/14/92
INVENTOR(S) : J.A. Lorenc

It is certified that error appears in the above-identified patent and that said Letters Patent is hereby corrected as shown below:

Col. 2, line 38 - after "centrifugal", insert ---pump of---.

Col. 3, line 39 - after the first occurrence of "pump", insert ---10---.

Col. 3, line 39 - after "casing", insert ---11---.

Col. 4, line 39 - "($\sqrt{\Delta P}$" should be ---($\sqrt{\Delta P}$)---.

Col. 4, line 40 - "($\sqrt{\Delta P}$" should be ---($\sqrt{\Delta P}$)---.

Col. 4, line 41 - "($\sqrt{\Delta P}$" should be ---($\sqrt{\Delta P}$)---.

Signed and Sealed this

Twenty-fourth Day of August, 1993

Attest:

BRUCE LEHMAN

Attesting Officer

Commissioner of Patents and Trademarks